US011185822B2

(12) United States Patent
Hirsch et al.

(10) Patent No.: US 11,185,822 B2
(45) Date of Patent: Nov. 30, 2021

(54) WATER CONDITIONING SYSTEMS HAVING DIVERSION DEVICES

(71) Applicant: Unger Marketing International, LLC, Bridgeport, CT (US)

(72) Inventors: Kai Hirsch, Cologne (DE); Stephen Huda, Shelton, CT (US); Robert Camp, Bethany, CT (US); Paul H. Adams, Monroe, CT (US)

(73) Assignee: UNGER MARKETING INTERNATIONAL, LLC, Bridgeport, CT (US)

( * ) Notice: Subject to any disclaimer, the term of this patent is extended or adjusted under 35 U.S.C. 154(b) by 116 days.

(21) Appl. No.: 16/743,210

(22) Filed: Jan. 15, 2020

(65) Prior Publication Data
US 2020/0147549 A1 May 14, 2020

Related U.S. Application Data

(63) Continuation of application No. 15/350,919, filed on Nov. 14, 2016, now Pat. No. 10,549,239.
(Continued)

(51) Int. Cl.
*B01D 61/02* (2006.01)
*B01D 61/08* (2006.01)
(Continued)

(52) U.S. Cl.
CPC ......... *B01D 61/025* (2013.01); *B01D 15/361* (2013.01); *B01D 35/1435* (2013.01);
(Continued)

(58) Field of Classification Search
CPC ............ B01D 15/361; B01D 2201/301; B01D 2201/347; B01D 2201/4076;
(Continued)

(56) References Cited

U.S. PATENT DOCUMENTS 3,774,763 A 11/1973 Yall et al.
4,119,517 A 10/1978 Hengst
(Continued)

FOREIGN PATENT DOCUMENTS

CN 203486997 3/2014
CN 204103914 1/2015
(Continued)

*Primary Examiner* — Terry K Cecil
(74) *Attorney, Agent, or Firm* — Cantor Colburn LLP

(57) ABSTRACT

A portable water conditioning system is provided that includes an incoming water inlet; a reverse osmosis stage in fluid communication with the incoming water inlet, the reverse osmosis stage having a permeate outlet and a concentrate outlet; a diversion device having a diversion valve, the diversion valve placing the concentrate outlet in fluid communication with a waste water outlet; a deionizing stage in fluid communication with a pure water outlet; a bypass valve configured to selectively place the permeate outlet in fluid communication with one or more of the waste water outlet, the deionizing stage, and the pure water outlet; and a controller configured to control the diversion device and the bypass valve to provide water at the pure water outlet of a desired condition.

14 Claims, 11 Drawing Sheets

Related U.S. Application Data

(60) Provisional application No. 62/342,380, filed on May 27, 2016, provisional application No. 62/342,373, filed on May 27, 2016, provisional application No. 62/342,403, filed on May 27, 2016, provisional application No. 62/254,448, filed on Nov. 12, 2015.

(51) Int. Cl.
```
B01D 35/143    (2006.01)
C02F 1/44      (2006.01)
B01D 15/36     (2006.01)
B01D 61/04     (2006.01)
B01D 61/12     (2006.01)
C02F 1/00      (2006.01)
C02F 5/00      (2006.01)
C02F 1/28      (2006.01)
C02F 1/42      (2006.01)
```

(52) U.S. Cl.
CPC ........... *B01D 61/022* (2013.01); *B01D 61/04* (2013.01); *B01D 61/08* (2013.01); *B01D 61/12* (2013.01); *C02F 1/001* (2013.01); *C02F 1/008* (2013.01); *C02F 1/441* (2013.01); *C02F 5/00* (2013.01); *B01D 2201/301* (2013.01); *B01D 2201/347* (2013.01); *B01D 2201/4076* (2013.01); *B01D 2311/14* (2013.01); *B01D 2311/246* (2013.01); *B01D 2311/2623* (2013.01); *B01D 2311/2649* (2013.01); *B01D 2313/02* (2013.01); *B01D 2313/04* (2013.01); *B01D 2313/125* (2013.01); *B01D 2313/20* (2013.01); *B01D 2313/21* (2013.01); *B01D 2313/24* (2013.01); *B01D 2313/44* (2013.01); *B01D 2317/04* (2013.01); *C02F 1/283* (2013.01); *C02F 1/42* (2013.01); *C02F 2201/004* (2013.01); *C02F 2201/006* (2013.01); *C02F 2201/008* (2013.01); *C02F 2209/003* (2013.01); *C02F 2209/008* (2013.01); *C02F 2209/03* (2013.01); *C02F 2209/10* (2013.01); *C02F 2307/06* (2013.01); *Y02W 10/37* (2015.05)

(58) Field of Classification Search
CPC .......... B01D 2311/14; B01D 2311/246; B01D 2311/2623; B01D 2311/2649; B01D 2313/02; B01D 2313/04; B01D 2313/125; B01D 2313/20; B01D 2313/21; B01D 2313/24; B01D 2313/44; B01D 2317/04; B01D 35/1435; B01D 61/022; B01D 61/025; B01D 61/04; B01D 61/08; B01D 61/12; C02F 1/001; C02F 1/008; C02F 1/283; C02F 1/42; C02F 1/441; C02F 2201/004; C02F 2201/006; C02F 2201/008; C02F 2209/003; C02F 2209/008; C02F 2209/03; C02F 2209/10; C02F 2307/06; C02F 5/00

See application file for complete search history.

(56) References Cited

U.S. PATENT DOCUMENTS

| | | |
|---|---|---|
| 4,230,579 A | 10/1980 | Bray |
| 4,722,128 A | 2/1988 | Keller |
| 4,801,375 A | 1/1989 | Padilla |
| 4,836,923 A | 6/1989 | Popoff |
| 4,967,960 A | 11/1990 | Futrell |
| 4,988,427 A | 1/1991 | Wright |
| 5,085,769 A | 2/1992 | Klausen et al. |
| 5,399,260 A | 3/1995 | Eldredge et al. |
| 5,503,735 A | 4/1996 | Vinas et al. |
| 5,547,584 A | 8/1996 | Capehart |
| 6,027,642 A | 2/2000 | Prince |
| 6,228,255 B1 | 5/2001 | Peterson et al. |
| 6,273,126 B1 | 8/2001 | Shen |
| 6,372,132 B1 | 4/2002 | Williams |
| 6,824,695 B2 | 11/2004 | Tempest, Jr. |
| 7,100,427 B2 | 9/2006 | Kahn et al. |
| 7,104,115 B2 | 9/2006 | Kahn et al. |
| 7,237,682 B2 | 7/2007 | Reynolds et al. |
| 7,249,000 B2 | 7/2007 | Kahn et al. |
| 7,632,410 B2 | 12/2009 | Heiss |
| 7,908,724 B2 | 3/2011 | Isabelle |
| 7,955,503 B2 | 6/2011 | Onota et al. |
| 8,469,331 B2 | 6/2013 | Burbank et al. |
| 8,486,275 B2 | 7/2013 | Wolf |
| 8,529,770 B2 | 9/2013 | Yencho |
| 8,900,459 B2 | 12/2014 | Tenne |
| 2003/0024870 A1 | 2/2003 | Reinhart |
| 2003/0127119 A1 | 7/2003 | Scordo |
| 2003/0196947 A1 | 10/2003 | Gundrum et al. |
| 2003/0230522 A1 | 12/2003 | Pavel |
| 2005/0016906 A1 | 1/2005 | Gettman |
| 2007/0045165 A1 | 3/2007 | Beall |
| 2007/0009059 A1 | 4/2007 | Plummer et al. |
| 2009/0008318 A1 | 1/2009 | Anes et al. |
| 2009/0182263 A1 | 7/2009 | Burbank et al. |
| 2009/0211605 A1 | 8/2009 | Ahmad |
| 2010/0109601 A1 | 5/2010 | Coyle et al. |
| 2010/0140095 A1 | 6/2010 | Telepciak et al. |
| 2012/0284982 A1 | 11/2012 | Chen et al. |
| 2013/0126430 A1 | 5/2013 | Kenley et al. |
| 2014/0083846 A1 | 3/2014 | Moon et al. |
| 2015/0336820 A1 | 11/2015 | Grabosch et al. |
| 2017/0136412 A1 | 5/2017 | Huda |
| 2017/0137303 A1 | 5/2017 | Hirsch et al. |

FOREIGN PATENT DOCUMENTS

| | | | |
|---|---|---|---|
| EP | 0331136 | 9/1989 | |
| EP | 0352779 | 1/1990 | |
| WO | 02100780 | 12/2002 | |
| WO | WO-2007018561 A1 * | 2/2007 | ............ C02F 1/441 |
| WO | 2008131546 A1 | 11/2008 | |
| WO | 2014110074 | 7/2014 | |
| WO | 2015157680 A1 | 10/2015 | |

* cited by examiner

WATER CONDITIONING SYSTEMS HAVING DIVERSION DEVICES

CROSS REFERENCE TO RELATED APPLICATIONS

This application is a continuation application of the legally related U.S. Ser. No. 15/350,919, filed Nov. 14, 2016, the contents of which are incorporated by reference herein in their entirety. Application Ser. No. 15/350,919, claims the benefit of U.S. Provisional Application No. 62/254,448, filed on Nov. 12, 2015; U.S. Provisional Application No. 62/342,403, filed on May 27, 2016; U.S. Provisional Application No. 62/342,373, filed on May 27, 2016; and U.S. Provisional Application No. 62/342,380, filed on May 27, 2016. The entire contents of the provisional application are incorporated by reference herein.

BACKGROUND

1. Field of the Disclosure

The present disclosure is related to water conditioning systems. More particularly, the present disclosure is related to portable water conditioning systems having diversion devices.

2. Description of Related Art

Water conditioners that condition incoming tap water for use in one or more tasks are known. The conditioned water can be used for various cleaning tasks such as, but not limited to cleaning of exterior windows, cleaning of vehicles, cleaning of solar panels/arrays, building, awnings, stone, and others.

As used herein, the term "conditioned water" shall mean water that has been filtered, (distilled), deionized, demineralized (e.g., via reverse osmosis), softened, anti-scaled, exposed to any other water treatment process—including the addition of one or more additives or components, and any combinations thereof. Thus, water conditioners can provide the conditioned water using different types of conditioning or filtering media.

It is known to assemble multiple water conditioners, which utilize different conditioning or filtering media, into water conditioning systems to provide the desired conditioned water. For example, some prior art water conditioning systems pass the incoming water through a pre-filter, in the form of a barrier filter or a reverse osmosis filter prior to passing the pre-filtered water through a deionizing resin filter.

It has been determined by the present disclosure that water conditioning systems are becoming increasingly complex with multiple conditioners and multiple types of conditioning media. Thus, it has been determined that such water conditioning systems require diversion devices that control the flow of water to optimize utilization of the conditioning media in the different conditioners.

SUMMARY

Water conditioning systems that make use deionizing (DI) resin to provide conditioned water have been found by the present disclosure to be very effective at providing conditioned water. However, the DI resin used to condition the water is consumed during the process and requires either replacement or recharging, which can increase the cost when using such systems.

Similarly, water conditioning systems that make use of reverse osmosis (RO) filters to provide conditioned water have also been found by the present disclosure to be very effective at providing conditioned water. However, the RO filters divide the incoming water into permeate (e.g., conditioned water) and concentrate (e.g., waste water), which can increase the amount of water required and increase the consumption of the DI resin at start-up when using such systems. In addition, the RO filters can have a reduced life due to scaling and/or fouling of the RO membrane when there is limited flow through the membrane and/or they are not flushed properly between uses.

Accordingly, the present disclosure provides water conditioning systems that have both DI conditioners and RO conditioners combined into a single easy to use system. The systems of the present disclosure advantageously include diversion devices that, in some embodiments, reduce the utilization of DI resin and extend the life of the RO conditioners by flushing the membrane after use. In addition, the systems of the present disclosure advantageously have pressure diversion devices that allow the operator to easily balance the flow of permeate and concentrate.

Additionally, the systems of the present disclosure provide, in other embodiments, diversion devices that include an automated startup state and/or automated shutdown state to optimize performance and/or minimize costs.

A portable water conditioning system is provided that includes an incoming water inlet; a reverse osmosis stage in fluid communication with the incoming water inlet, the reverse osmosis stage having a permeate outlet and a concentrate outlet; a diversion device having a diversion valve, the diversion valve placing the concentrate outlet in fluid communication with a waste water outlet; a deionizing stage in fluid communication with a pure water outlet; a bypass valve configured to selectively place the permeate outlet in fluid communication with one or more of the waste water outlet, the deionizing stage, and the pure water outlet; and a controller configured to control the diversion device and the bypass valve to provide water at the pure water outlet of a desired condition.

In some embodiments either alone or in combination with one or more of the afore and/or aft mentioned embodiments, the system further includes a pump having a pump inlet in fluid communication with the incoming water inlet and a pump outlet, the reverse osmosis stage being in fluid communication with the incoming water inlet via the pump outlet.

In some embodiments either alone or in combination with one or more of the afore and/or aft mentioned embodiments, the diversion device further includes a recirculation line that places the concentrate outlet in fluid communication with the pump inlet.

In some embodiments either alone or in combination with one or more of the afore and/or aft mentioned embodiments, the system further includes a backpressure regulator controlling a pressure within a concentrate stream in the recirculation line to divert a portion of the concentrate stream back to the pump inlet.

In some embodiments either alone or in combination with one or more of the afore and/or aft mentioned embodiments, the backpressure regulator includes an adjustable pressure regulator having a variable flow plug, a biasing spring, and a pressure adjustment cap.

In some embodiments either alone or in combination with one or more of the afore and/or aft mentioned embodiments, the backpressure regulator is in communication with the controller and being controlled by the.

A portable water conditioning system is also provided that includes an incoming water inlet; a reverse osmosis stage in fluid communication with the incoming water inlet, the reverse osmosis stage having a permeate outlet and a concentrate outlet; a deionizing stage in fluid communication with a pure water outlet; a bypass valve configured to selectively place the permeate outlet in fluid communication with one or more of a waste water outlet, the deionizing stage, and the pure water outlet; and a controller configured to control the bypass valve to provide water at the pure water outlet of a desired condition.

In some embodiments either alone or in combination with one or more of the afore and/or aft mentioned embodiments, the system includes a pre-filter stage placing the incoming water inlet in fluid communication with the reverse osmosis stage.

In some embodiments either alone or in combination with one or more of the afore and/or aft mentioned embodiments, the pre-filter can be a particle filter and/or a chlorine filter.

In some embodiments either alone or in combination with one or more of the afore and/or aft mentioned embodiments, the system can further include a pump having a pump inlet in fluid communication with the incoming water inlet and a pump outlet, the reverse osmosis stage being in fluid communication with the incoming water inlet via the pump outlet.

In some embodiments either alone or in combination with one or more of the afore and/or aft mentioned embodiments, the system can further include a diversion device having a recirculation line and a diversion valve, the recirculation line placing the concentrate outlet in fluid communication with the pump inlet, the diversion valve placing the concentrate outlet in fluid communication with the waste water outlet.

In some embodiments either alone or in combination with one or more of the afore and/or aft mentioned embodiments, the controller is configured to control the pump, the diversion device, and the bypass valve to provide water at the pure water outlet of the desired condition.

In some embodiments either alone or in combination with one or more of the afore and/or aft mentioned embodiments, the system can further include a pre-filter stage placing the incoming water inlet in fluid communication with the pump inlet.

In some embodiments either alone or in combination with one or more of the afore and/or aft mentioned embodiments, the system can further include a pressure relief valve in fluid communication with the pump outlet and the waste water outlet and in parallel with the reverse osmosis stage.

In some embodiments either alone or in combination with one or more of the afore and/or aft mentioned embodiments, the pressure relief valve is configured to relieve pressure induced by the pump over a desired pressure to the waste water outlet without passing through the reverse osmosis stage.

In some embodiments either alone or in combination with one or more of the afore and/or aft mentioned embodiments, the pressure relief valve is in communication with the controller, the controller being configured to control the pressure relieve valve.

In some embodiments either alone or in combination with one or more of the afore and/or aft mentioned embodiments, the controller can control the diversion device to adjust flow through the reverse osmosis stage.

In some embodiments either alone or in combination with one or more of the afore and/or aft mentioned embodiments, the diversion device can further include a concentrate flow control valve in communication with the controller, the controller controlling the concentrate flow control valve to ensure a minimum flow through the reverse osmosis stage during a start-up process to reduce scaling and fouling of the reverse osmosis stage.

In some embodiments either alone or in combination with one or more of the afore and/or aft mentioned embodiments, the concentrate flow control valve is controlled to provide a constant back pressure on the reverse osmosis stage necessary to perform an RO performance calculation under constant conditions.

In some embodiments either alone or in combination with one or more of the afore and/or aft mentioned embodiments, the system can further include a diversion device having a diversion valve, the diversion valve placing the concentrate outlet in fluid communication with the waste water outlet.

In some embodiments either alone or in combination with one or more of the afore and/or aft mentioned embodiments, the diversion device is manually operable to balance a flow of permeate and concentrate from the reverse osmosis stage.

In some embodiments either alone or in combination with one or more of the afore and/or aft mentioned embodiments, the controller has an automated startup state selectable by the diversion device.

In some embodiments either alone or in combination with one or more of the afore and/or aft mentioned embodiments, the controller, when in the automated startup state, controls the bypass valve and the pump to discharge water on a permeate side of reverse osmosis stage to the waste water outlet.

In some embodiments either alone or in combination with one or more of the afore and/or aft mentioned embodiments, the controller operates in the automated startup state for a predetermined period of time.

In some embodiments either alone or in combination with one or more of the afore and/or aft mentioned embodiments, the controller operates in the automated startup state until a sensor in communication with the controller measures water quality at the permeate outlet of a predetermined state.

In some embodiments either alone or in combination with one or more of the afore and/or aft mentioned embodiments, the controller, after completion of the automated startup state, controls the bypass valve to place the permeate outlet in fluid communication with the deionization stage or the pure water outlet.

In some embodiments either alone or in combination with one or more of the afore and/or aft mentioned embodiments, the controller activates the automated startup state based on a system downtime timer.

In some embodiments either alone or in combination with one or more of the afore and/or aft mentioned embodiments, the controller activates the automated startup state based on an input from a sensor in communication with the controller that measure water quality at the permeate outlet.

In some embodiments either alone or in combination with one or more of the afore and/or aft mentioned embodiments, the controller has an automated shutdown state selectable by the diversion device.

In some embodiments either alone or in combination with one or more of the afore and/or aft mentioned embodiments, the controller, when in the automated shutdown state, maximizes flow from the reverse osmosis stage through a permeate stream and minimizes flow through a concentrate stream.

In some embodiments either alone or in combination with one or more of the afore and/or aft mentioned embodiments, the controller, when in the automated shutdown state, controls the pump to a desired water flow rate, control the bypass valve to place the permeate outlet in fluid communication with the waste water outlet.

In some embodiments either alone or in combination with one or more of the afore and/or aft mentioned embodiments, the controller operates in the automated shutdown state for a predetermined period of time.

In some embodiments either alone or in combination with one or more of the afore and/or aft mentioned embodiments, the controller operates in the automated shutdown state until a sensor in communication with the controller measures water quality at the permeate outlet of a predetermined state.

In some embodiments either alone or in combination with one or more of the afore and/or aft mentioned embodiments, the controller activates the automated shutdown state based on a system runtime timer.

In some embodiments either alone or in combination with one or more of the afore and/or aft mentioned embodiments, the controller activates the automated shutdown state based on an input from a sensor in communication with the controller that measure water quality at the permeate outlet.

In some embodiments either alone or in combination with one or more of the afore and/or aft mentioned embodiments, the controller further includes a temporary hold state, wherein the controller, when in the temporary hold state, controls the bypass valve to place the permeate outlet in fluid communication with the waste water outlet.

In some embodiments either alone or in combination with one or more of the afore and/or aft mentioned embodiments, the controller controls the bypass valve to place the permeate outlet in fluid communication with the pure water outlet so that water exiting the pure water outlet bypasses the deionizing stage.

In some embodiments either alone or in combination with one or more of the afore and/or aft mentioned embodiments, the controller controls the bypass valve to place the permeate outlet in fluid communication with the deionizing stage so that water exiting the pure water outlet is conditioned by the deionizing stage.

In some embodiments either alone or in combination with one or more of the afore and/or aft mentioned embodiments, the controller controls the bypass valve to place the permeate outlet in fluid communication with the waste water outlet so that water exiting the waste water outlet bypasses the deionizing stage.

In some embodiments either alone or in combination with one or more of the afore and/or aft mentioned embodiments, the system further includes a backpressure regulator controlling a pressure within a concentrate stream in the recirculation line to divert a portion of the concentrate stream back to the pump inlet.

In some embodiments either alone or in combination with one or more of the afore and/or aft mentioned embodiments, the backpressure regulator includes an adjustable pressure regulator having a variable flow plug, a biasing spring, and a pressure adjustment cap.

In some embodiments either alone or in combination with one or more of the afore and/or aft mentioned embodiments, the backpressure regulator is in communication with the controller so that the controller controls the backpressure regulator.

The above-described and other features and advantages of the present disclosure will be appreciated and understood by those skilled in the art from the following detailed description, drawings, and appended claims.

DESCRIPTION OF THE DRAWINGS

The patent or application file contains at least one photograph executed in color. Copies of this patent or patent application publication with color drawing(s) will be provided by the Office upon request and payment of the necessary fee.

DETAILED DESCRIPTION

Figure 1:
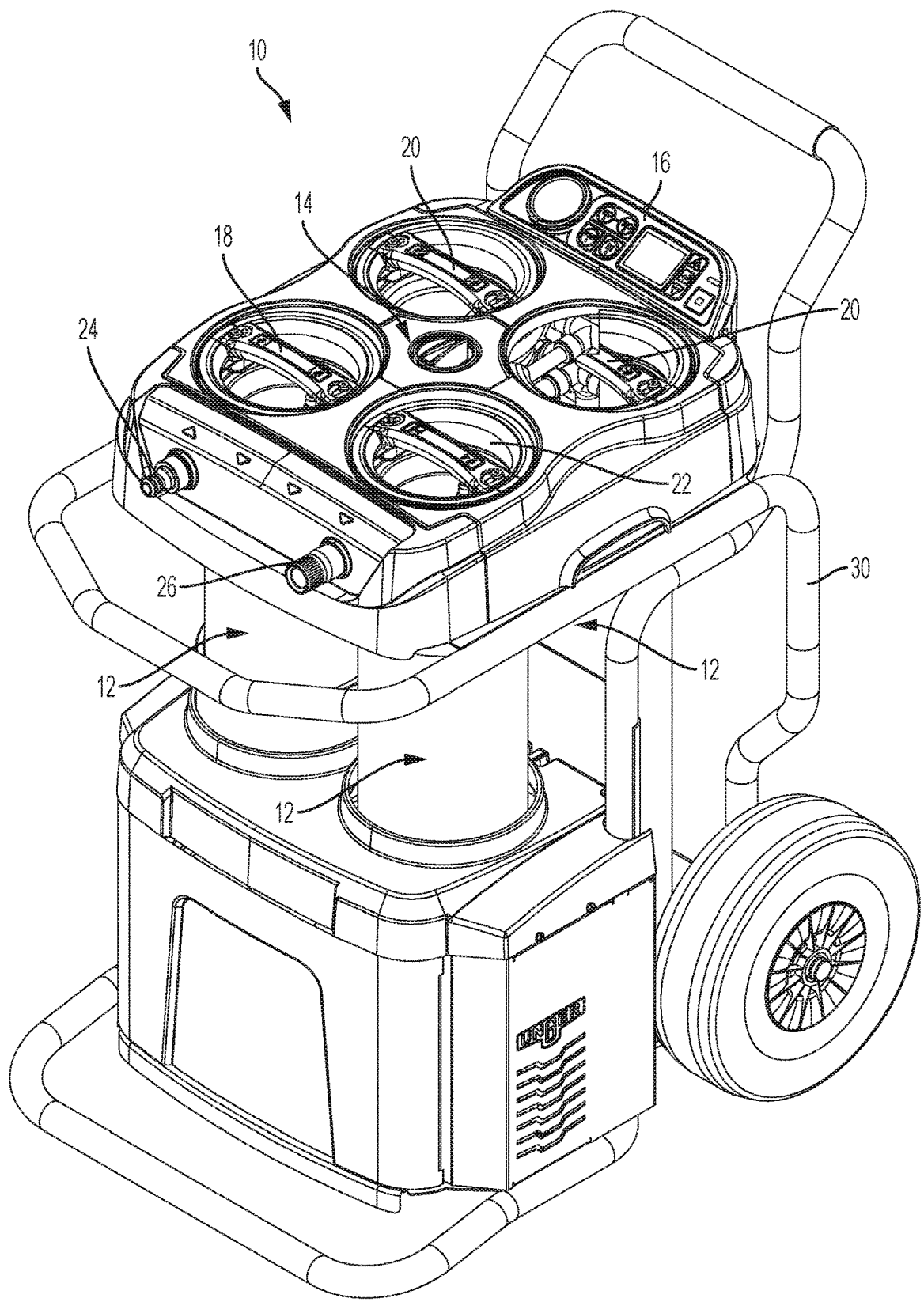
FIG. 1 is a top perspective view of an exemplary embodiment of a water conditioning system according to the present disclosure.
Figure 2:
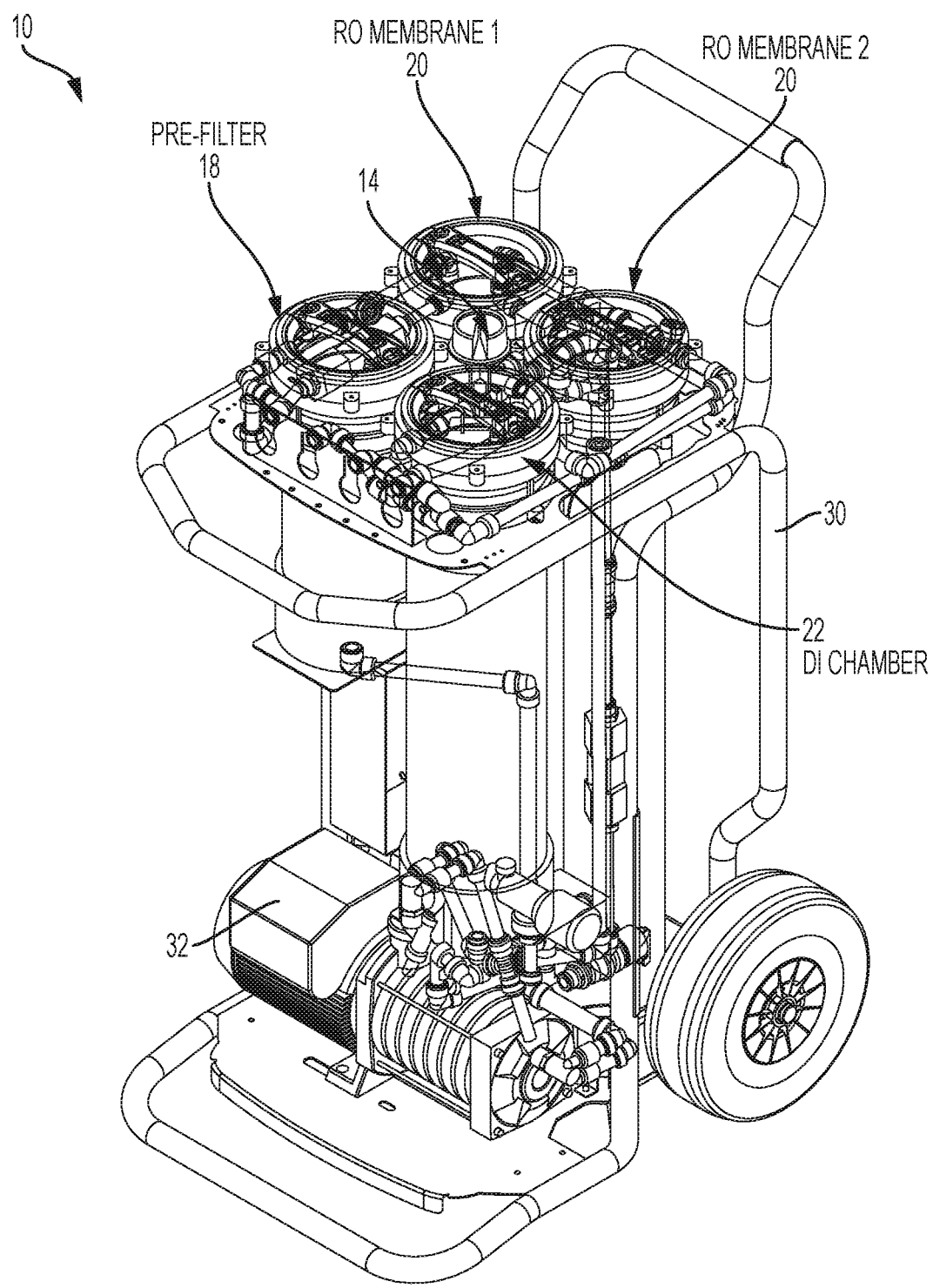
FIGS. 2 and 3 are top perspective views of the water conditioning system of FIG. 1 having various elements omitted for clarity.
Figure 3:
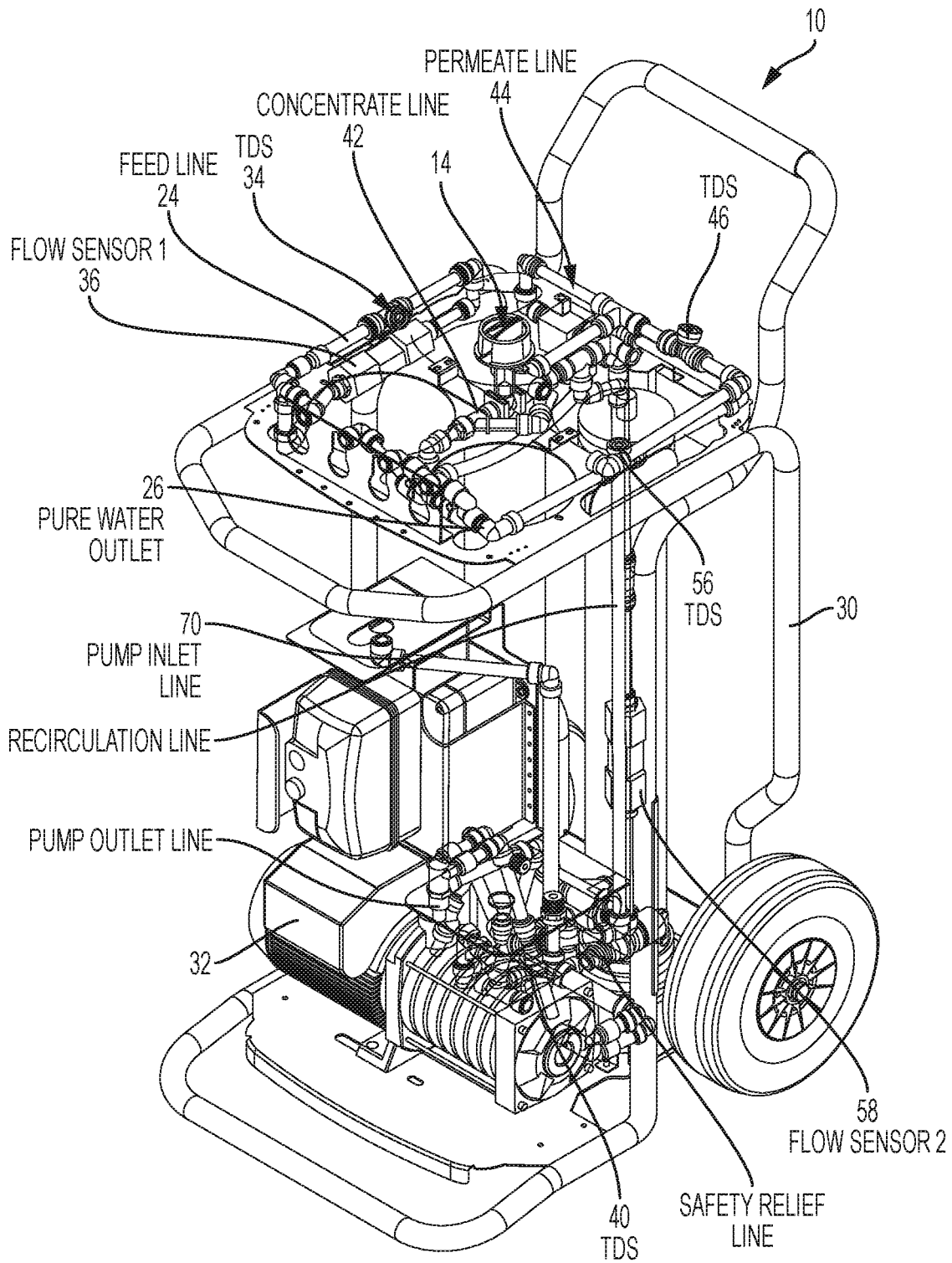
Figure 4:
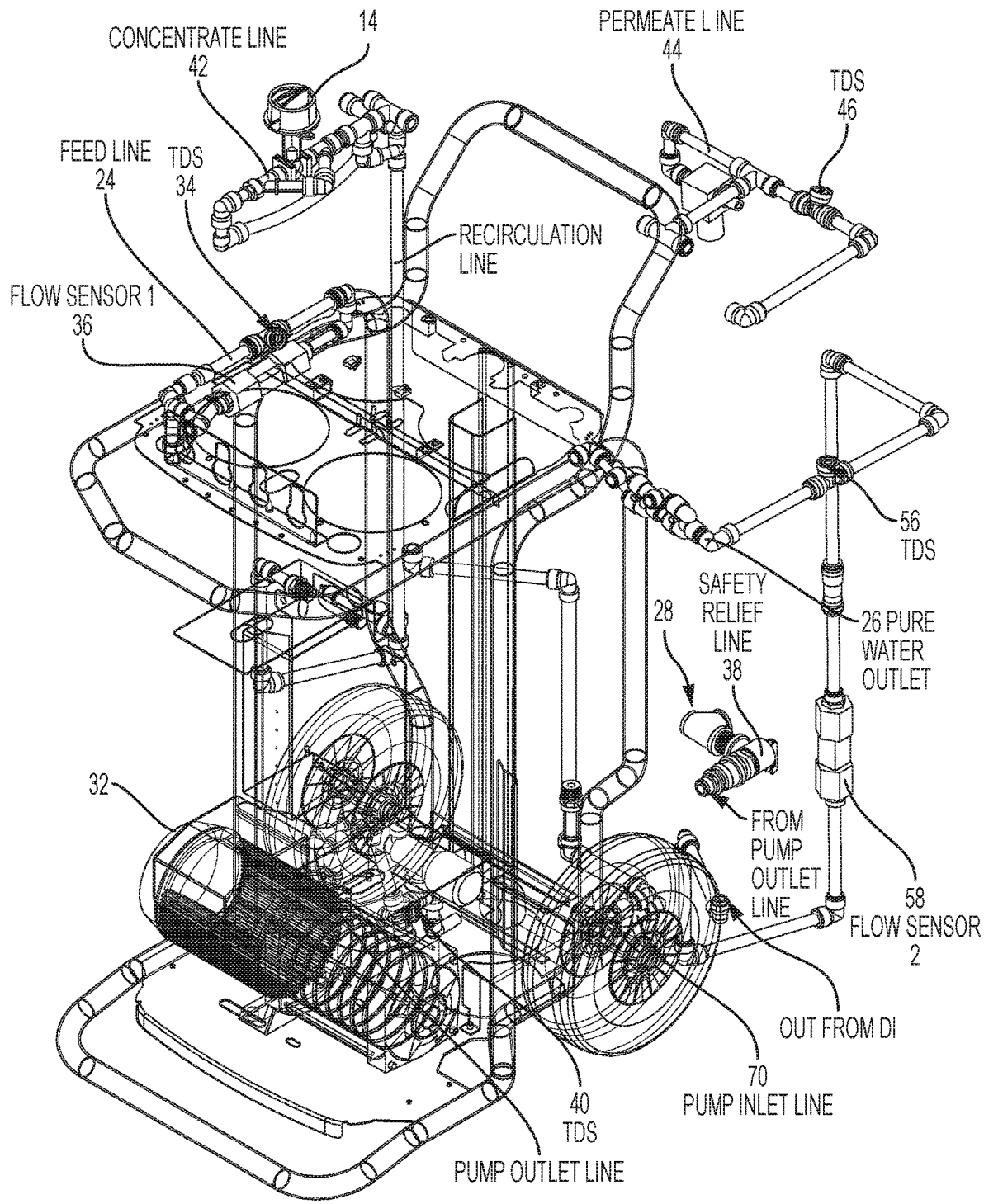
FIG. 4 is a partially exploded view of the water conditioning system of FIG. 1.

Referring to the drawings and in particular to FIGS. 1-4, an exemplary embodiment of a water conditioning system according to the present disclosure is shown and is referred to as reference numeral 10. System 10 includes a plurality of water conditioners 12 in fluid communication with a diversion device 14.

Advantageously, diversion device 14 is configured to allow the operator to optimize the utilization of the filter media in conditioners 12 and/or minimize the use of the water conditioned by the conditioner.

As discussed above, "conditioned water" means water that has been filtered, deionized, demineralized, softened, exposed any other water treatment process—including the addition of one or more additives or components, and any combinations thereof. Thus, conditioners 12 can include any conditioning and/or filtering media such as, but not limited to, a particle filter, a chlorine filter (i.e., activated carbon), an ion remover (e.g., deionization resin and/or reverse osmosis membrane), a UV sterilizer, and any combinations thereof.

In the illustrated embodiment, conditioners 12 include one or more pre-filters 18 (one shown), one or more RO filters 20 (two shown), and one or more DI filters 22 (one shown). Of course, it is contemplated by the present disclosure for conditions 12 to include a particle filter, a chlorine filter (i.e., activated carbon), an ion remover (e.g., deionization resin and/or reverse osmosis membrane), a UV sterilizer, and any combinations thereof. When disclosing "particle filtration", it is contemplated by the present disclosure for conditioner 12 to be sufficient for any desired filtration level such as, but not limited to, nano-filtration, ultra-filtration, micro-filtration, and others.

By way of example, DI filters 22 can be a device as shown and described in Applicant's own U.S. application Ser. No. 14/684,071 filed on Apr. 10, 2015, the contents of which are incorporated in their entirety herein. Conditioner 12 can also include the system as shown and described in Applicant's own U.S. Application Ser. No. 62/160,832 filed on May 13, 2015, the contents of which are incorporated in their entirety herein.

System 10 includes a tap water inlet 24, a pure water outlet 26, and one or more waste water outlets 28 (shown in FIGS. 5 and 9) the fluid communication of which are described in more detail below.

System 10 includes, in some embodiments, a frame 30 retaining a motorized pump 32, conditioners 12, diversion device 14, and controller 16 in a single, easy to use mobile unit. Of course, it is contemplated by the present disclosure for the various components of system 10 to be unitary or separate as desired e.g., pump 32 can be separate from the frame 30.

Figure 5:
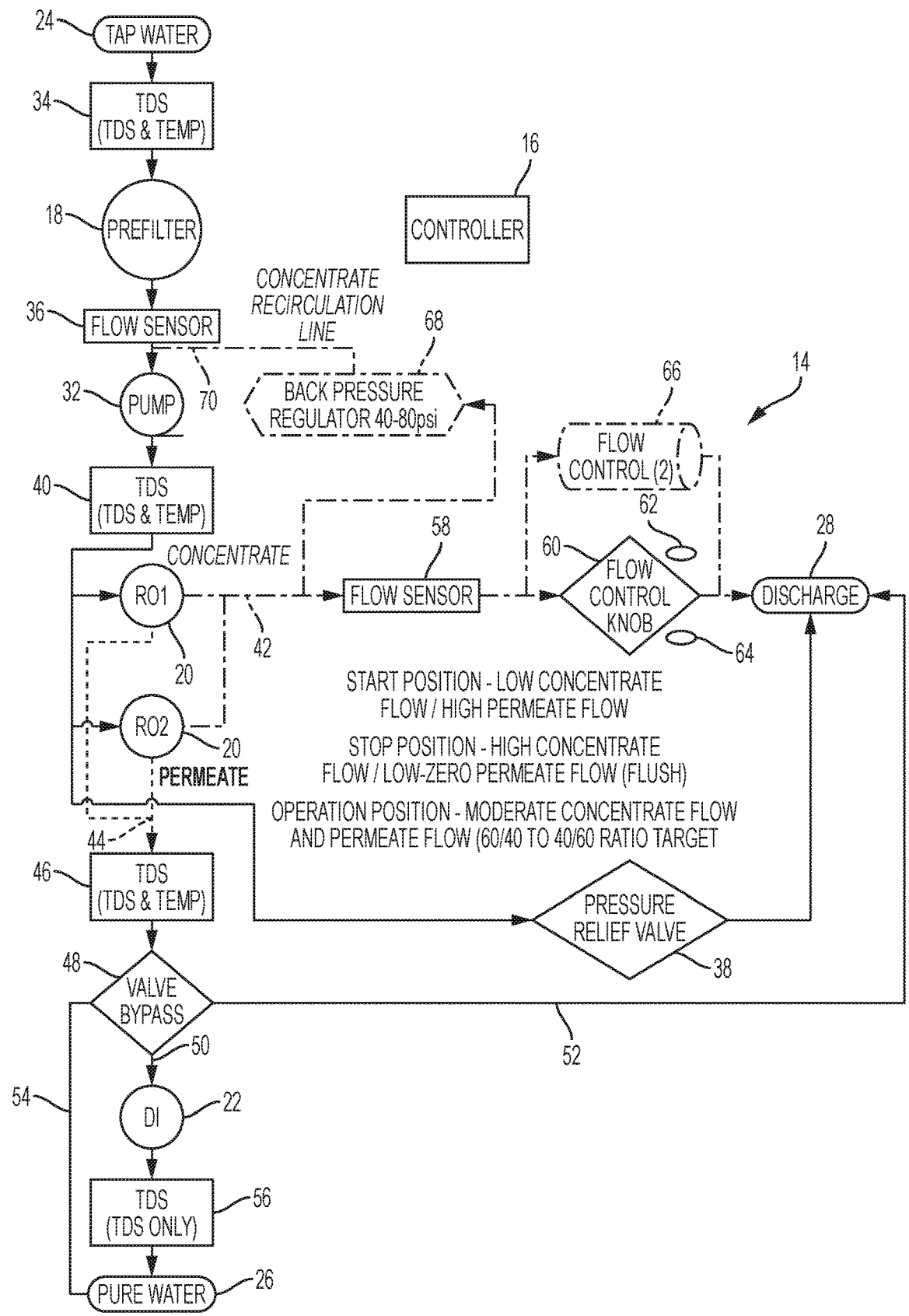
FIG. 5 is a process and instrument diagram (PNID) of the water conditioning system of FIG. 1.

The direction of flow through system 10 and the operation of diversion device 14, as well as the inputs into controller 16, are described with reference to FIG. 5, as well as FIGS. 1-4.

Water is input into system 10 at inlet 24. In some embodiments, system 10 includes a first sensor 34 to determine a state of the incoming water at or proximate inlet 24. For example, first sensor 34 can be a sensor configured to measure total dissolved solids (TDS), water temperature, water pressure, water temperature, pH, chlorine, flow, and others parameters. First sensor 34 is in wired and/or wireless communication with controller 16 so that the controller has access to the measurements detected by the first sensor.

The incoming water is then conditioned by a pre-filter 18 to at least partially condition the water. System 10 can, in some embodiments, include a second sensor 36 to determine a state of the water exiting pre-filter 18 such as, but not limited to a flow rate prior to pump 32 the incoming flow rate and/or minimum flow prior to turning on the pump. For example, second sensor 36 can be a sensor configured to measure total dissolved solids (TDS), water temperature, water pressure, water temperature, pH, chlorine, flow, and others parameters. Second sensor 36 is in wired and/or wireless communication with controller 16 so that the controller has access to the measurements detected by the second sensor.

System 10 can further include a pressure relief valve 38 that relieves pressure in the event a desired maximum pressure is exceed. Valve 38 can be a mechanical pressure relief valve, a pressure relief rupture disk, an electronic pressure relief valve, any other relief device, or combinations thereof. Valve 38 can, in some embodiments, be in wired and/or wireless communication with controller 16 so that the valve can be activated by controller as needed. Preferably and as illustrated, valve 38 is illustrated as being in the flow of water after pump 32 and in parallel with RO filters 20. In this manner, pressure induced in system 10 by pump 32 over a desired pressure can be relieved to outlet 28, without passing through the RO filters. Of course, it is contemplated by the present disclosure for valve 38 have any desired position within system 10 and/or for the system to have multiple pressure relief valves.

Pump 32 can be in wired and/or wireless communication with controller 16 so that the controller controls one or more parameters of the pump. For example, controller 16 can control a speed of pump 32, a pressure induced by the pump, a flow rate induced by the pump, turn the pump on or off, and any other desired control functions. Pump 32 can be any desired pumping device such as, but not limited to, positive displacement pump, a diaphragm pump, a booster pump, a multistage pump, and others.

System 10 can, in some embodiments, include a third sensor 40 to determine a state of the water entering RO filters 20, preferably in the recirculation loop. For example, third sensor 40 can be a sensor configured to measure total dissolved solids (TDS), water temperature, water pressure, water temperature, pH, chlorine, flow, and others parameters. Third sensor 40 is in wired and/or wireless communication with controller 16 so that the controller has access to the measurements detected by the third sensor.

System 10 is illustrated having two RO filters 20 connected in parallel to one another. Of course, it is contemplated by the present disclosure for filters 20, or any of conditioners 12 to be connected in series and/or parallel to one another.

Water passing through RO filters 20 is conditioned by the RO filters, which separates the water into a waste or concentrate stream 42 and a conditioned or permeate stream 44.

Beginning with the flow of permeate stream 44, system 10 can include a sixth sensor 46 to determine a final state of the permeate stream. For example, sensor 46 can be a sensor configured to measure total dissolved solids (TDS), water temperature, water pressure, water temperature, pH, chlorine, flow, and others parameters. Sensor 46 is in wired and/or wireless communication with controller 16 so that the controller has access to the measurements detected by the sensor.

System 10 further includes a bypass valve 48 that is in wired and/or wired communication with controller 16 so that the controller can operate the valve between a first position 50 that places the permeate stream in fluid communication with DI filter 22 or a second position 52 that places the permeate stream in fluid communication with waste water outlet 28.

In some embodiments, valve 48 can further be controlled by controller 16 to operate to a third position 54 that places the permeate stream in fluid communication with pure water outlet 26—such as may occur when the performance of RO filters 20 provide the permeate stream with sufficient water quality as determined by sensor 46.

In instances where valve 48 is controlled to place the permeate stream in fluid communication with DI filter 22, the permeate stream is further conditioned by the DI filter.

System 10 can include a sensor 56 to determine a state of the conditioned stream after DI filter 22 and before the conditioned water exits the system at outlet 26. For example, sensor 56 can be a sensor configured to measure total dissolved solids (TDS), water temperature, water pressure, water temperature, pH, chlorine, flow, and others parameters. Sensor 56 is in wired and/or wireless communication with controller 16 so that the controller has access to the measurements detected by the sensor.

Returning now to the flow of concentrate stream 42, system 10 can include a sensor 58 to determine a state of the concentrate stream and/or permeate stream. For example, sensor 58 can be a sensor configured to measure total dissolved solids (TDS), water temperature, water pressure, water temperature, pH, chlorine, flow rate, and others parameters. Sensor 58 is in wired and/or wireless communication with controller 16 so that the controller has access to the measurements detected by the sensor.

System 10 further includes diversion device 14. Diversion device 14, preferably, includes a valve 60, a start position sensor or switch 62, and a stop position sensor or switch 64. Sensors 62, 64 are in wired and/or wireless communication with controller. Valve 60 and/or sensor 62 are positioned and configured to allow the sensor 62 to detect when the valve 60 is in a "start position" such as when the valve is in contact or otherwise sensed by sensor 62. Similarly, valve 60 and/or sensor 64 are positioned and configured to allow the sensor 64 to detect when the valve 60 is in a "stop position" such as when the valve is in contact or otherwise sensed by sensor 64.

Valve 60, when in the start position, is closed or mostly closed to minimize the flow through concentrate stream 42 and maximize the flow through permeate stream 44. Conversely, valve 60, when in stop position, is open or mostly opened to maximize the flow through concentrate stream 42 and minimize the flow through permeate stream 44.

Figure 6:
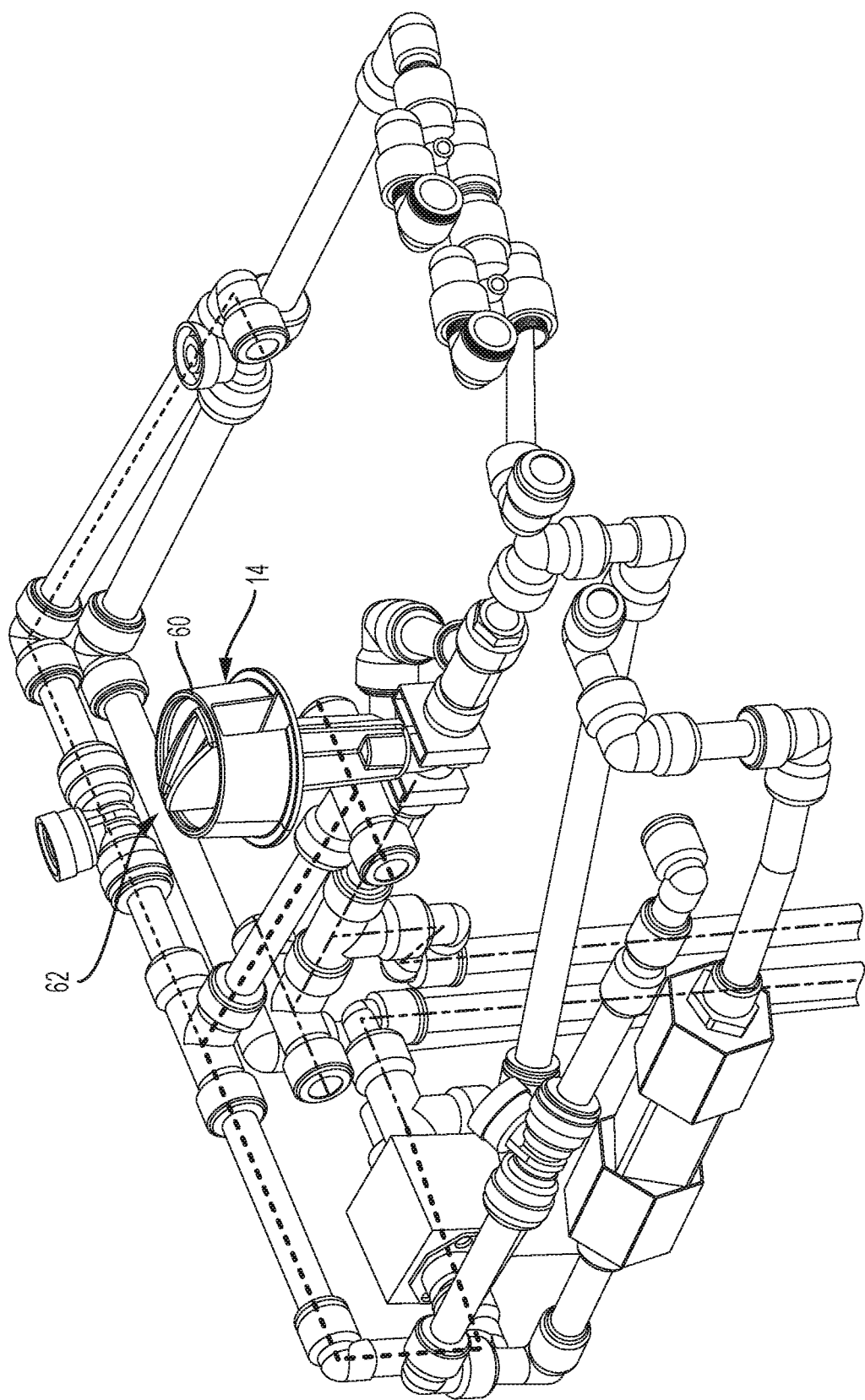
FIG. 6 illustrates a flow through the water conditioning system of FIG. 1 when the diversion device is in a startup state.

System 10 is configured to operate in a startup mode when diversion device 14 is moved to the start position as shown in FIG. 6, upon controller 16 detecting from sensor 62 that valve 60 is in the start position. During startup mode, valve 60 is closed or mostly closed and valve 48 is moved to second position 52 and pump 32 is turned on—if there is enough flow of water detected by sensor 36—by controller 16 so that any high TDS water that has collected on the permeate side of the membrane in RO filter 20 is discharged through outlet 28. In this manner, system 10 provides the startup mode, which is believed to transfer water having high TDS from RO filters 20 to outlet 28 and, thus, preventing high TDS water at startup from prematurely depleting the resin in DI filter 22.

For example, system 10 can be configured to, upon controller 16 detecting from sensor 62 that valve 60 is in the start position, control the controller to turn on pump 32 and move valve 48 to second position 52, sending permeate stream 44 to waste for a predetermined period of time. System 10 operates in the startup mode for a predetermined period of time that is, preferably, a period of time sufficient to transfer the high TDS water that is within RO filters 20 to waste outlet 28. The predetermined period of time may be a set period or may be determined by controller based on inputs from one or more of sensors 34, 36, 40, 46, 56, and 58.

After the predetermined period of time, controller 16 controls valve 48 to move the valve to first position 50 so that that the permeate stream 44 is fluidly communicated to DI filter 22, providing conditioned water from the DI filter to water outlet 26.

In embodiments where valve 48 includes third position 54, controller 16 can be further configured to control valve 48—after completion of the predetermined period of time or may be determined by controller based on inputs from one or more of sensors 34, 36, 40, 46, 56, and 58—to move to the valve to third position 54 so that permeate stream 44 is in fluid communication with pure water outlet 26 without passing through DI filter 22—as may occur when the performance of RO filters 20 provide the permeate stream with sufficient water quality as determined by sensor 46, providing conditioned water from the RO filters to water outlet 26.

It should be recognized that, in this embodiment, valve 48 is disclosed by way of example as having three positions. Of course, it is contemplated by the present disclosure for valve 48 to be a combination of different multiple 2-way valves to accomplish the same function.

Valve 60 can be adjusted by the user and/or by controller 16, dependent on a rotational position of the valve between the start and stop positions, to adjust the flow through concentrate stream 42 and permeate stream 44 as desired.

In some embodiments, system 10 can include a timer in controller 16 that only activates the aforementioned startup mode when the controller detects that the system has been off for more than a predetermined period of time. Here, the predetermined period of time within which contaminates within RO filter 20 pass from the concentrate side of the membrane to the permeate side. In some embodiments, system 10 is configured to use signals from sensor 46 or one or more other sensors to determine whether to begin the startup mode.

In other embodiments, it is contemplated by the present disclosure for controller 16 to move valve 48 to second position 52 during start up when sensor 46 detect TDS level above a predetermined level and keep valve 48 in the second position until the TDS levels at sensor 46 drops below an acceptable predetermined level, at which time controller 16 can move valve 48 to first position 50 to place permeate stream 44 in fluid communication with DI filter 22 or can move valve 48 to third position 54 to place permeate stream 44 in fluid communication with outlet 26.

Controller 16 uses the input from sensors 40, 46 positioned before and after RO filters 20 to determine an efficiency of the RO stage—which is commonly referred to as the "percent rejection". The percent rejection is a determination of the percent of dissolved solids that are rejected by the membrane present in RO filters 20. The dissolved solids that are rejected remain in the concentrate flow (i.e., a flow of concentrated dissolved solids), while any dissolved solids that are not rejected pass through the membrane to the permeate flow.

In one example, controller 16—after completion of startup mode—performs a simple compare of the inputs from sensors 40, 46 to determine the percent rejection. Advantageously and without wishing to be bound by any particular theory, system 10 is configured—via the startup mode—to compensate for variables that are believed to affect the accuracy of the percent rejection calculation.

For example, controller 16—during startup mode—allows water to flow through RO filters 20 so as to achieve a steady state operation of the filters by purging any high TDS water that may have settled in the filters, as well as to achieve a constant temperature within the system 10. Moreover, controller 16—during startup mode—controls bypass valve 48 to place permeate flow 44 in fluid communication with waste water outlet 28—which is believed to reduce or minimize the effects of back pressure induced within system 10 by DI filter 22 and/or any cleaning devices in fluid communication with outlet 26. Finally during startup mode, system 10 ensures that diversion device 14 is in a known or predetermined state to provide a known pressure to RO filters 20. In the embodiment illustrated in FIG. 5, diversion device 14 commences the startup mode when valve 60 is detected at the start position by sensor or switch 62 (i.e., closed), valve 66, when present, ensures a minimum flow through RO filters 20, and backpressure regulator 68 ensures that pressure in the diversion device is maintained within a predetermined range. In this manner, system 10 ensures that the percent rejection is determined with system 10 is at a known or substantially known condition, which has been found by the present disclosure to improve the accuracy and repeatability of the percent rejection calculation.

Thus, in some embodiments system 10 is configured to determine the percent rejection after controller 16 has completed the startup mode so as to improve the accuracy and repeatability of the percent rejection calculation.

Of course, it is contemplated by the present disclosure for system 10 to determine the percent rejection at any desired time and/or to determine when to measure the total dissolved solids and calculate the percent rejection based on the input from one or more sensors in the system and/or control of one or more portions by controller 16. Without wishing to be bound by any particular theory, the variables believed to affect the accuracy and repeatability of the percent reduction include, but are not limited to, the state of diversion device 14 (e.g., valve 60, flow control 66, and backpressure regulator 68), the state of bypass valve 48, and whether any stagnant water within RO filter 20 has been purged sufficiently to provide a steady state of the water (e.g., TDS level, temperature, etc.) flowing through the filter. Thus, it is contemplated by the present disclosure for the percent rejection to be determined at any time when these conditions are controlled to minimize inaccuracy in the determination.

Once the startup mode is completed, system 10 can be considered to be operating in a normal or operational mode.

Figure 7:
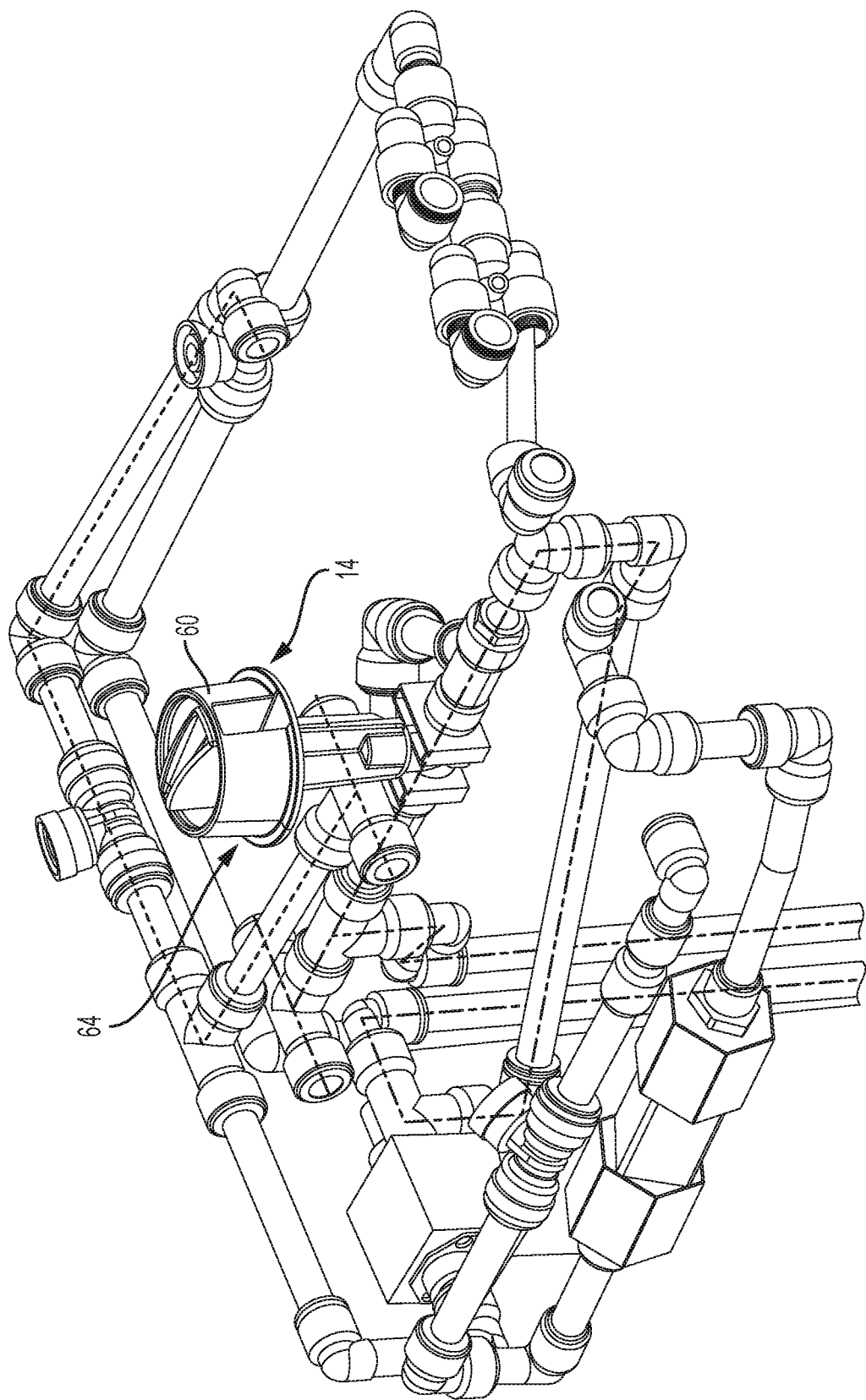
FIG. 7 illustrates a flow through the water conditioning system of FIG. 1 when the diversion device is in a shutdown state.
Figure 8:
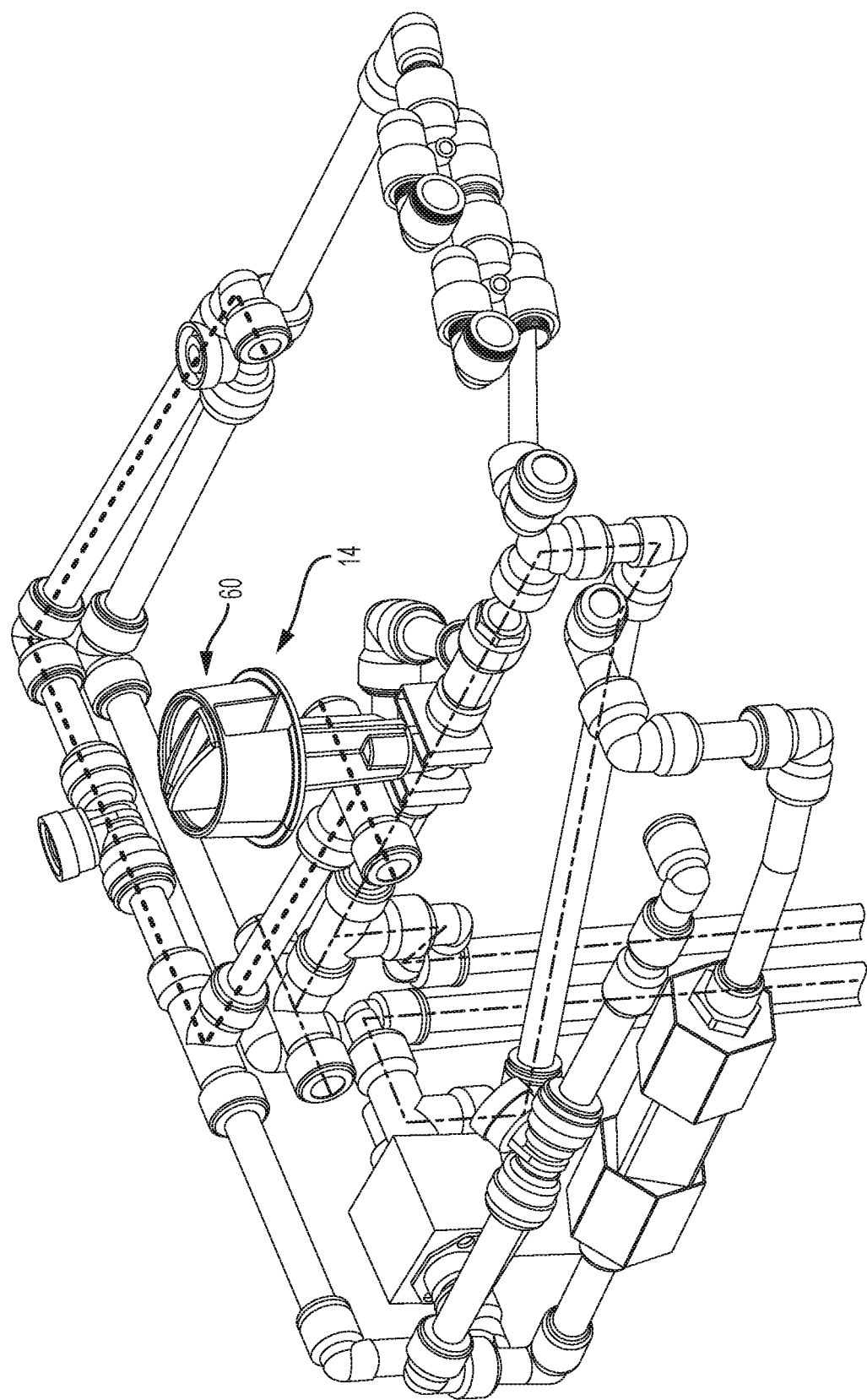
FIG. 8 illustrates a flow through the water conditioning system of FIG. 1 when the diversion device is in an operation or run state.

System 10 is also configured—via controller 16—to operate in a shutdown mode when diversion device 14 is moved to the stop position as shown in FIG. 7 as detected by sensor 64. As discussed above, diversion device 14—when valve 60 is in the stop position maximizes flow of concentrate stream 42 and minimizes flow through permeate stream 44 by reducing the backpressure on the concentrate line by opening of valve 60.

During the shutdown mode, system 10 is configured to flush water, preferably at about 3 gallons per minute, through each RO filter 20 to outlet 28, which is believed to remove scale and particulate matter from the RO filters, thus extending the life of the membranes in the RO filters.

For example, system 10 can be configured to, upon controller 16 detecting from sensor 64 that valve 60 is in the stop position—which is an open position with full flow to waste water outlet 28, control the controller to ensure pump 32 is on—if there is enough flow of water detected by sensor 36—and move valve 48 to a closed position, reducing flow of permeate stream 44 and increasing flow of concentrate stream 42. The predetermined period of time is, preferably, a period of time sufficient to flush a desired amount of scale or debris that is within RO filters 20 to waste outlet 28. The predetermined period of time may be a set period or may be determined by controller based on inputs from one or more of sensors 34, 36, 40, 46, 56, and 58. After the predetermined period of time, controller 16 turns pump 32 off.

In other embodiments, system 10 can include a timer in controller 16 that only activates the aforementioned shutdown mode when the controller detects that the system has been on for more than a predetermined period of time. Here, the predetermined period of time within which contaminates build within RO filter 20 beyond a threshold. In some embodiments, system 10 is configured to use signals from sensor 46 or one or more other sensors to determine whether to begin shutdown mode.

In still other embodiments, system 10 can be configured to, upon controller 16 detecting that water outlet 26 is closed or at least partially closed, control the controller to leave/turn on pump 32 and move valve 48 to second position 52, sending permeate stream 44 to waste. Here, system 10 can be considered to be operating in a temporary hold mode, where the operator may cease use of the system temporarily—preventing excessive pressure in the system and improving membrane health. It is contemplated by the present disclosure for outlet 26 to be closed by—for example—a manual or automatic valve (not shown) at the outlet or a valve in communication with the outlet such as on a cleaning implement. In some embodiments, system 10 is configured to use signals from a sensor on the valve (not shown) to determine whether to begin and/or end temporary hold mode. In other embodiments, system 10 is configured to use signals from one or more other sensors such as pressure or flow sensors at outlet 26 or elsewhere in the system to determine whether to begin and/or end temporary hold mode.

In still other embodiments, system 10 can be configured to, upon controller 16 detecting that water outlet 26 is closed or partially closed, control the controller to leave/turn on pump 32 and control pressure relief valve 38 so that pressure induced in system 10 by the pump can be relieved to outlet 28, without passing through RO filters 20.

In still other embodiments, system 10 can further include a timer in controller 16 that shuts down the system if the controller detects that the system has been operating in temporary mode for longer than a predetermined period of time.

It is contemplated by the present disclosure for diversion device 14 to further include a concentrate flow control valve 66, which preferably is set to a predetermined level. Of course, it is contemplated by the present disclosure for valve 66 to be user adjustable and/or adjustable via controller 16. Valve 66, when present, ensures a minimum flow through RO filters 20 when valve 60 is closed (i.e., in the start-up position) to reduce scaling and fouling. Valve 66 is preferably set to allow flow of concentrate stream 42 regardless of the position of valve 60, which is believed to provide a constant backpressure on RO filters 20—which allows controller 16 to perform an RO performance calculation under constant conditions.

Figure 9:
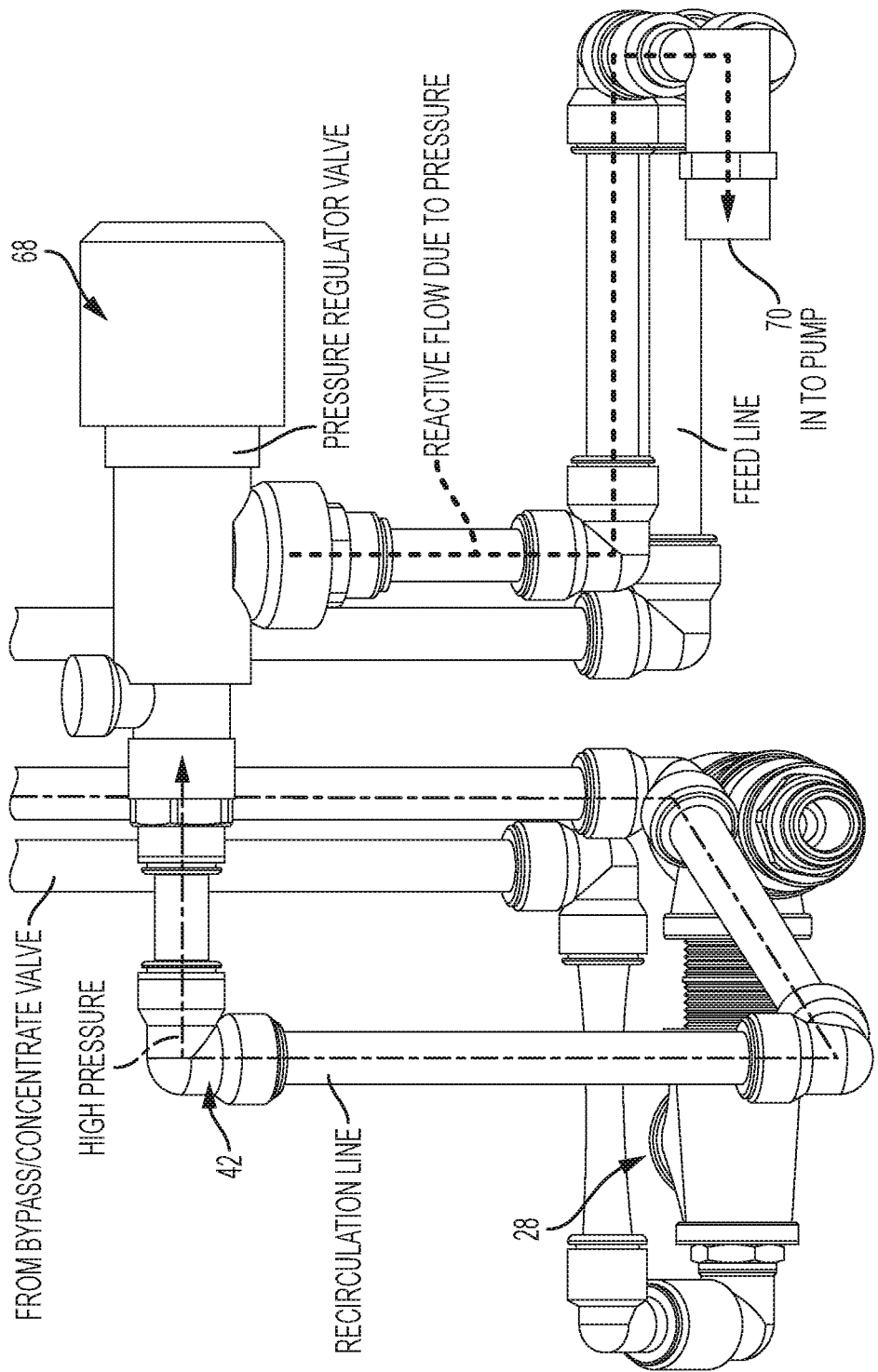
FIG. 9 illustrates a flow through a backpressure regulator valve when the diversion device is in the operation or run state.
Figure 9A:
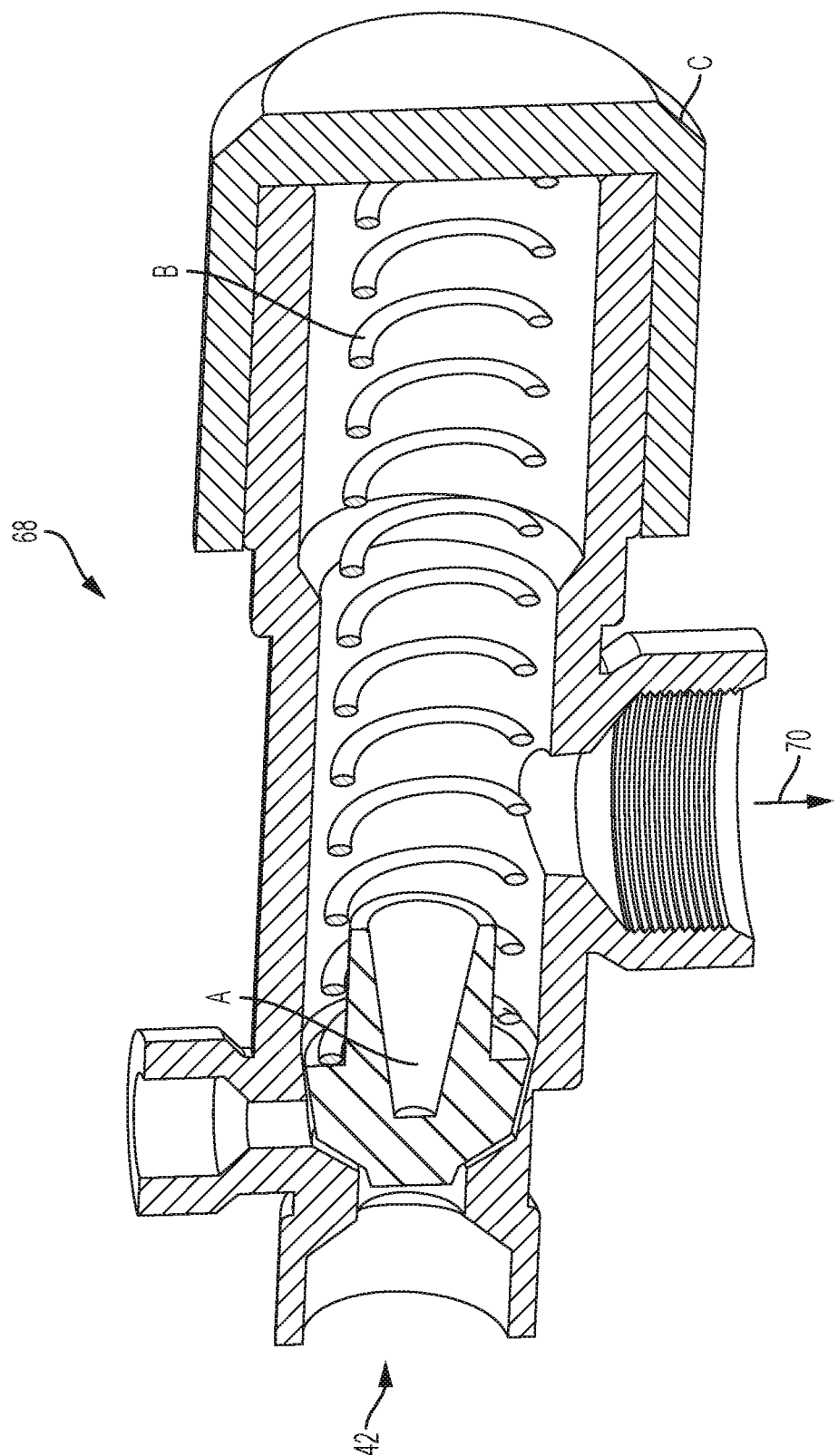
FIG. 9*a* is a sectional view of the backpressure regulator valve of FIG. 9.

In some embodiments, system 10 can include a backpressure regulator 68 that fluidly communicates concentrate stream 42 to pump inlet 70 as shown in FIGS. 9 and 9a. When the pressure within concentrate stream 42 exceeds a predetermined backpressure, backpressure regulator 68 opens to divert a portion of the concentrate stream flow back to inlet 70 so that as pressure increases in the concentrate stream, the flow through regulator 68 increases.

Preferably, backpressure regulator 68 is an adjustable pressure regulator having a variable flow plug (A), a biasing spring (B), and a pressure adjustment cap (C). Of course, it is contemplated by the present disclosure for regulator 68 to be an electronic regulator that is in wired or wireless communication with controller 16 so that the controller can control the regulator based on inputs from one or more of sensors 34, 36, 40, 46, and 58. In some embodiments, biasing spring (B) is a variable force spring (B) that compresses at a variable rate to allow an increase in flow to pump inlet 70.

Accordingly, system 10 is advantageously controlled and monitored by controller 16 and operated by the user via diversion device 14 to selectively pass incoming water through one or more of conditioners 12 to provide conditioned water of desired quality.

It should be recognized that system 10 is described herein by way of example only. Of course, it is contemplated by the present disclosure for system 10 to include any number of different conditioners that are fluidly connectable to one another in series, in parallel, and any combinations thereof. Further, it is contemplated for controller 16 to detect one or more operational attributes of the pump 32 such as, but not limited to, current, voltage, temperature, speed, pressure, and others—and adjust the operation of system 10 based on these attributes.

Figure 10:
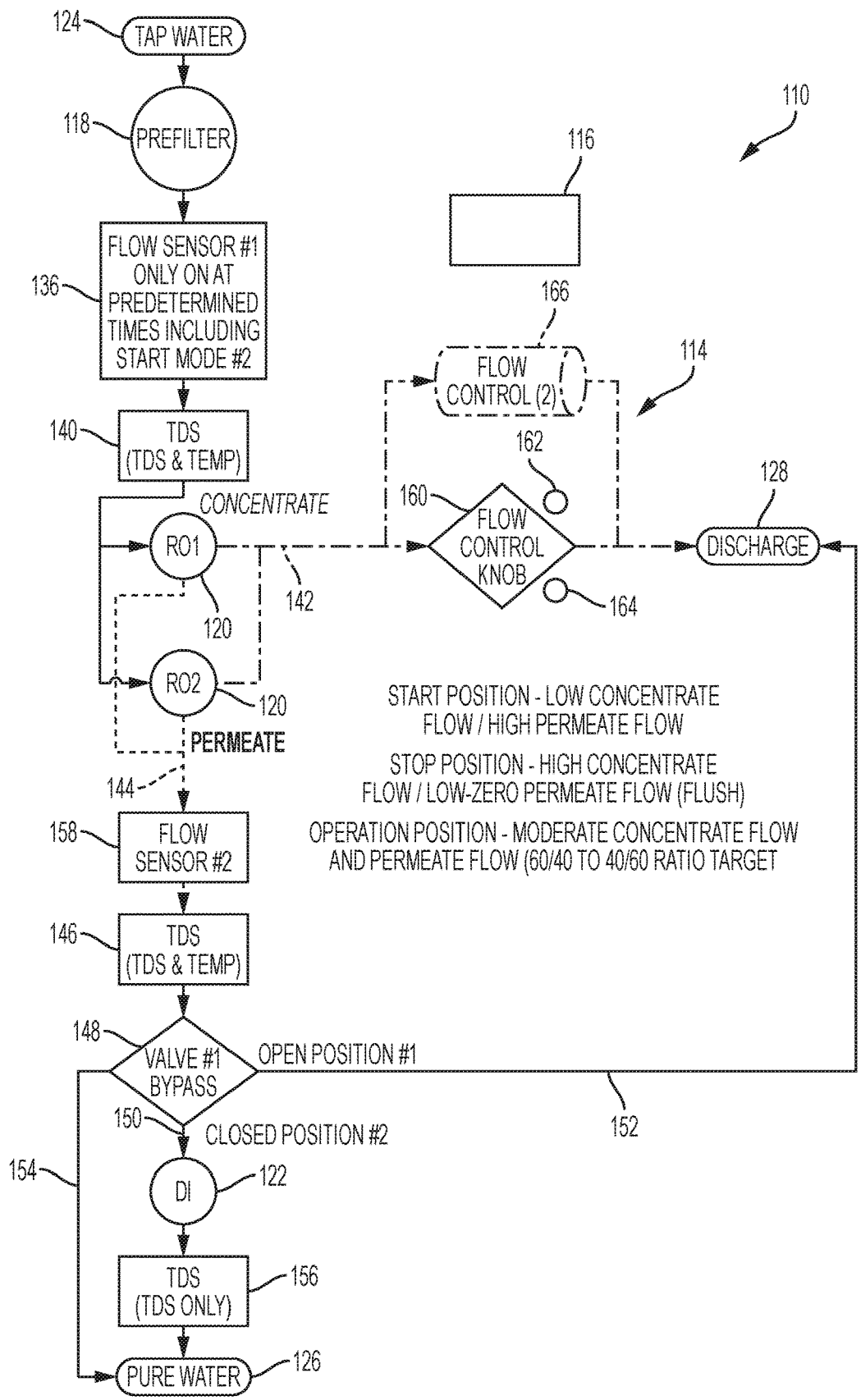
FIG. 10 is an alternate exemplary embodiment of a process and instrument diagram (PNID) of a water conditioning system according to the present disclosure, which omits the pump and backpressure regulator of the system of FIG. 1.

It is also contemplated by the present disclosure for system 10 to operate without the assistance of pump 32—namely under only the effect of incoming water pressure or any combinations thereof. FIG. 10 is an alternate exemplary embodiment of a process and instrument diagram (PNID) of a water conditioning system 110 according to the present disclosure, which omits pump 32 of system 10. In addition, system 110 is illustrated lacking various components of system 10 associated with pump 32 such as, but not limited to, backpressure regulator 68.

System 110 is illustrated in FIG. 10 having component parts performing similar or analogous functions to those of system 10 labeled in multiples of one hundred.

System 110 includes tap water inlet 124, pure water outlet 126, and waste water outlet 128. Water is input into system 110 at inlet 124.

The incoming water is then conditioned by a pre-filter 118 to at least partially condition the water. System 110 can, in some embodiments, include a sensor 136 to determine a state of the water exiting pre-filter 118, where the second sensor 136 is in wired and/or wireless communication with controller 116.

System 110 can, in some embodiments, include a sensor 140 to determine a state of the water entering RO filters 120, where the sensor 140 is in wired and/or wireless communication with controller 116.

Water passing through RO filters 120 is conditioned by the RO filters, which separates the water into a waste or concentrate stream 142 and a conditioned or permeate stream 144.

System 110 can include sensors 146, 158 to determine a state of permeate stream 144, where the sensors 146, 158 are in wired and/or wireless communication with controller 116.

System 110 further includes bypass valve 148 that is in wired and/or wired communication with controller 116 so that the controller can operate the valve between a first position 150 that places the permeate stream in fluid communication with DI filter 122 or a second position 152 that places the permeate stream in fluid communication with waste water outlet 128.

In some embodiments, valve 148 can further be controlled by controller 116 to operate to a third position 154 that places the permeate stream in fluid communication with pure water outlet 126—such as may occur when the performance of RO filters 120 provide the permeate stream with sufficient water quality as determined by sensor 146.

In instances where valve 148 is controlled to place the permeate stream in fluid communication with DI filter 122, the permeate stream is further conditioned by the DI filter.

System 110 can include a sensor 156 to determine a state of the conditioned stream after DI filter 120 and before the conditioned water exits the system at outlet 126, where sensor 156 is in wired and/or wireless communication with controller 116.

Returning now to the flow of concentrate stream 142, system 110 includes diversion device 114. Diversion device 114, preferably, includes a rotating valve 160, a start position sensor/switch 162, and a stop position sensor/switch 164. Sensors/switch 162, 164 are in wired and/or wireless communication with controller 116. Valve 160 and/or sensor 162 are positioned and configured to allow the sensor 162 to detect when the valve 160 is in a "start position" such as when the valve is in contact or otherwise sensed by sensor 162. Similarly, valve 160 and/or sensor 164 are positioned and configured to allow the sensor 164 to detect when the valve 160 is in a "stop position" such as when the valve is in contact or otherwise sensed by sensor 164.

System 110 is configured—via controller 116—to operate in a startup mode when diversion device 114 is moved to the start position—valve 160 is closed. For example, system 110 can be configured to, upon controller 116 detecting from sensor 162 that valve 160 is in the start position, control the controller to valve 148 to second position 152, sending permeate stream 144 to waste 128 for a predetermined period of time. After the predetermined period of time, controller 116 controls valve 148 to move the valve to first position 150 so that that the permeate stream 144 is fluidly communicated to DI filter 122, providing conditioned water from the DI filter to water outlet 126.

It should be recognized that the present disclosure has been described by way of example only as having systems 10, 110 being placed into the startup and shutdown modes via movement of valve 60, 160, respectively. Of course, it is contemplated by the present disclosure for systems 10, 110 to be configured to enter and leave the various modes by any desired input.

In embodiments where valve 148 includes third position 154, controller 116 can be further configured to control valve 148—after completion of the predetermined period of time—to move to the valve 148 to third position 154 so that permeate stream 144 is in fluid communication with pure water outlet 126 without passing through DI filter 122. It is further contemplated, in embodiments where valve 148 has multiple positions, for controller 16 to automatically move the valve 148 to any desired position based on one or more sensor input.

System 110 is also configured—via controller 116—to operate in a shutdown mode when diversion device 114 is moved to the stop position. During the shutdown mode, system 110 is configured to flush through RO filters 120 to outlet 128, which is believed to remove scale and particulate matter from the RO filters, thus extending the life of the filter membranes.

It is further contemplated by the present disclosure for controller 116 to automatically operate in the shutdown or flush mode based, at least in part, on a sensor reaching one or more predetermined values such as, but not limited to, too much backpressure across the RO membranes, too little flow across the membranes, poor TDS in the permeate flow, flow is reduced to zero for too long, percent rejection, any other desired condition.

For example, system 110 can be configured to, upon controller 116 detecting from sensor 164 that valve 160 is in the stop position—which is an open or mostly open position with full flow to waste water outlet 128—to move valve 148 to a closed position, reducing flow of permeate stream 144 and increasing flow of concentrate stream 142. The predetermined period of time is, preferably, a period of time sufficient to flush a desired amount of scale or debris that is within RO filters 120 to waste outlet 128.

It is contemplated by the present disclosure for diversion device 114 to further include a concentrate flow control valve 166, which allows the user to control a flow rate of concentrate flow 142 to outlet 128 when operating in a normal or run mode—with valve 160 between the stop and start positions.

Flow control valve 166 can be an electronic controlled valve, in wired or wireless electrical communication, with controller 116. Here, valve 160 can provide a variable signal to controller 116 dependent on a rotational position of the valve between the start and stop positions proportional to the desired flow rate.

In other embodiments, valve 166 can be a mechanical valve that is controlled by the rotational position of valve 160.

Accordingly, system 110 is advantageously controlled and monitored by controller 116 and operated by the user via diversion device 114 to selectively pass incoming water through one or more of conditioners 118, 120, 122 to provide conditioned water of desired quality.

Accordingly, systems 10, 110 are configured so that the user does not need to perform any steps besides turning the system on/off and adjusting the flow to the desired level, yet the system automatically performs the startup and shutdown processes to optimize utilization of DI resin and RO membrane health, as well as indicate the status or health of each of the replaceable filter elements.

It should also be noted that the terms "first", "second", "third", "upper", "lower", "start", "stop", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of any claims hereafter presented.

What is claimed is:

1. A portable water conditioning system, comprising:
    an incoming water inlet;
    a reverse osmosis stage in fluid communication with the incoming water inlet, the reverse osmosis stage having a permeate outlet and a concentrate outlet;
    a deionizing stage in fluid communication with a pure water outlet;
    a bypass valve configured to selectively place the permeate outlet in fluid communication with each of a waste water outlet, the deionizing stage, and the pure water outlet; and
    a controller configured to control the bypass valve to selectively control a supply of water to the pure water outlet and the waste water outlet based on a desired condition,
    wherein, during a startup mode, the controller is configured to open the bypass valve to increase a waste water flow to transfer water having high total dissolved solids to pass through the waste water outlet and, during a shutdown mode, the controller is configured to close the bypass valve to flush the system of waste water and increase a flow of waste water through the concentrate outlet and the waste water outlet.

2. The system of claim 1, further comprising a diversion device that places the concentrate outlet in fluid communication with the waste water outlet.

3. The system of claim 2, wherein the diversion device further comprises a diversion valve that selectively places the concentrate outlet in fluid communication with a waste water outlet.

4. The system of claim 3, wherein the diversion valve is in communication with the controller, the controller being configured to detect a position of the diversion valve.

5. The system of claim 3, wherein the diversion valve is in communication with the controller, the controller being configured to control a position of the diversion valve.

6. The system of claim 3, wherein the diversion device further comprises a flow control valve that ensures a minimum flow around the diversion valve to the waste water outlet.

7. The system of claim 6, wherein the flow control valve is set to a predetermined level of flow.

8. The system of claim 6, wherein the flow control valve has an adjustable level of flow.

9. The system of claim 8, wherein the flow control valve is in communication with the controller, the controller being configured to adjust the level of flow.

10. The system of claim 6, further comprising a pump having a pump inlet in fluid communication with the incoming water inlet and a pump outlet, the reverse osmosis stage being in fluid communication with the incoming water inlet via the pump outlet.

11. The system of claim 10, wherein the diversion device further comprises a recirculation line, the recirculation line placing the concentrate outlet in fluid communication with the pump inlet.

12. The system of claim 11, further comprising a backpressure regulator controlling a pressure within a concentrate stream in the recirculation line to divert a portion of the concentrate stream back to the pump inlet.

13. The system of claim 12, wherein the backpressure regulator comprises an adjustable pressure regulator having a variable flow plug, a biasing spring, and a pressure adjustment cap.

14. The system of claim 12, wherein the backpressure regulator is in communication with the controller, the controller being configured to control the backpressure regulator.

* * * * *